(No Model.)

A. W. NICHOLSON.
TRAP FOR WASH BASINS.

No. 245,011. Patented Aug. 2, 1881.

Witnesses:
W. W. Provine
O. D. Lewis

Andrew W. Nicholson
Inventor

UNITED STATES PATENT OFFICE.

ANDREW W. NICHOLSON, OF BROOKLYN, NEW YORK.

TRAP FOR WASH-BASINS.

SPECIFICATION forming part of Letters Patent No. 245,011, dated August 2, 1881.

Application filed September 29, 1880. (No model.)

*To all whom it may concern:*

Be it known that I, ANDREW W. NICHOLSON, a citizen of the United States, residing in the city of Brooklyn, county of Kings, and State of New York, have invented certain new and useful Improvements in Traps for Wash Hand-Basins and other purposes, of which the following is a specification.

My invention relates to a fluid-trap. It is intended to allow the passage of fluids through it one way and to prevent the passage of fluids through it the other way. The seal is quicksilver and the trap works automatically. This I accomplish as set forth in the following specification.

Figure 1:
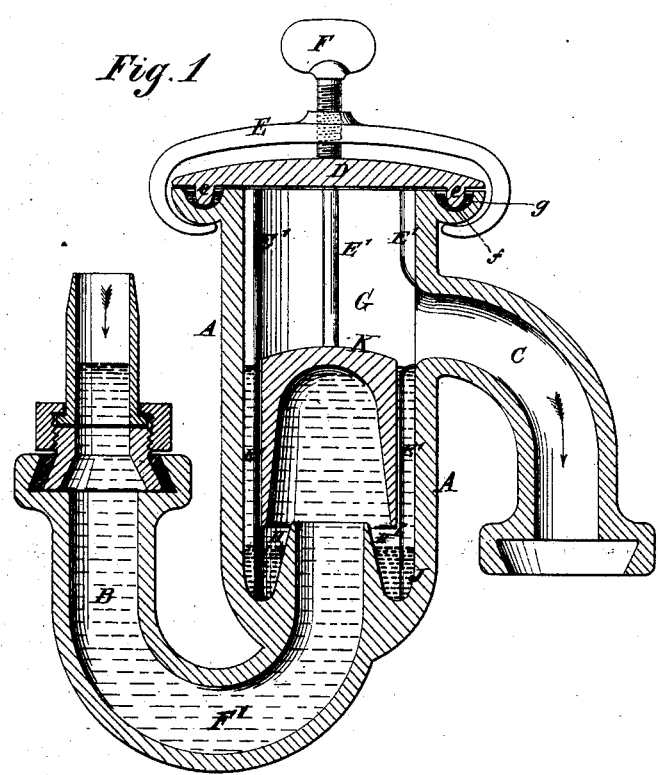

Figure 1 in the drawings accompanying the specification is a sectional view of the trap.

A is the body or trunk of the trap.

B is the inlet, and C is the outlet, to the waste-pipe.

D is the cap of the trap, screwed to its place by means of the clamp E and screw F.

At the top of the trap is a flanged projection, $g$, in which is a groove, $f$, and into this groove the cap D fits loosely, as shown at $e\ e$. This groove $f$ is charged with quicksilver, to prevent the escape of any gas from the body of the trap.

G is the main chamber of the trap, and the inlet-pipe B is extended up above the bottom of the chamber G, so as to form a reservoir or deposit, H, around the end of the inlet-pipe B, within which the quicksilver is deposited at J.

K is an inverted cup the edges of which rest in the reservoir H, and it floats or rests by its own gravity in or on the quicksilver when the trap is not automatically opened by the force of the current flowing through it.

The operation of the trap when applied to wash hand-basins is as follows: When the basin of water, which is located above the level of the extended pipe B within the chamber G, is discharged of its water, the force or pressure of the water upon the inside of the inverted cup K raises it within the chamber G sufficiently to permit the water to flow past the outlet C and be discharged into the waste-pipe. When the basin is discharged of its water the inverted cup K again descends and its edges again rest in or on the quicksilver in the reservoir H, thereby securely sealing automatically the trap, so that no impure or other gas or atmosphere can pass from the waste-pipe to the basin. The water in the trap is thereby separated by the quicksilver into two distinct portions, the one portion, L, of the water being above or on the outlet side of the quicksilver, and the other, F', below or on the inlet side of the quicksilver, so that should the water exposed to the action of the sewer-gas on the outlet side of the trap become contaminated the water on the inlet or basin side of the trap would be pure or free from such contamination, or, in absence of the water-seal, the quicksilver-seal is ample.

Figure 2:
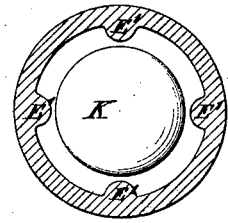

Guides may be constructed in the interior of the chamber G, as shown in Fig. 2, to insure the perpendicular position of the inverted cup K, also enlarging the water-way around the cup K.

In the construction of the trap, I use glass, porcelain, or any other suitable material.

The inverted cup K should be a trifle heavier than the water it displaces when immersed in water with its mouth downward, to insure the descent of the cup and allow its edge to rest in or on the quicksilver.

Having fully described my invention, I claim—

The trap A, the inlet-pipe B, the outlet-pipe C, the inverted cup K, in combination with the quicksilver-seal J, and the water-seal F' and L, substantially as shown.

ANDREW W. NICHOLSON.

Witnesses:
W. W. PERRINE,
O. B. LEWIS.